United States Patent [19]

Schwartz

[11] Patent Number: 4,957,443

[45] Date of Patent: Sep. 18, 1990

[54] EDUCATIONAL CARD GAME SYSTEM

[76] Inventor: Franklin B. Schwartz, 848 E. 28 St., C-9, Brooklyn, N.Y. 11210

[21] Appl. No.: 293,702

[22] Filed: Jan. 5, 1989

[51] Int. Cl.$^5$ .......................... G09B 19/00; A63F 1/00
[52] U.S. Cl. ..................................... 434/188; 273/299; 273/302; 434/156; 434/191; 434/208
[58] Field of Search ............... 434/188, 191, 208, 156; 273/299, 302

[56] References Cited

U.S. PATENT DOCUMENTS

| | | | |
|---|---|---|---|
| 3,663,021 | 5/1972 | Whippo | 273/296 |
| 4,273,542 | 6/1981 | Zellweger | 434/433 |
| 4,281,835 | 8/1981 | Seiden | 273/299 |

*Primary Examiner*—William H. Grieb

[57] ABSTRACT

An educational game system consisting of three or more individual decks of cards, and, in some embodiments, an extra set of cards used for special situations to be described hereinafter, and consisting of at least two individual games. The first of the two games is for developing a working knowledge of a set of mathematical (e.g. arithmetic, propositional, lingual) relations, and can be played by two to a given number n of players using one deck, up to 2n players using two decks, up to 3n players using three decks, etc. The second game is a game of skill and chance, played using all of the decks, which is also a means of separating the decks from each other.

30 Claims, 2 Drawing Sheets

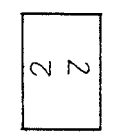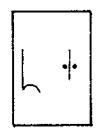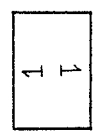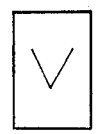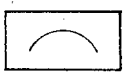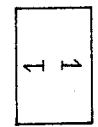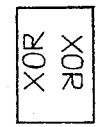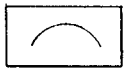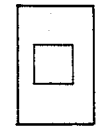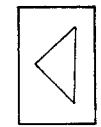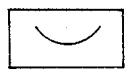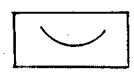
Fig. 9

EDUCATIONAL CARD GAME SYSTEM

BACKGROUND OF THE INVENTION

This invention relates in general to educational card games. In particular, it relates to games played with cards as the sole material element, in which both chance and the skills of the players are factors which determine the outcome of the game.

This invention presents two games with the advantages of being both recreational and educational, the first of which can be played with one to as many decks as a given embodiment consists of (depending on the number of players), and the second of which has the advantage of facilitating the quick separation of all of the decks used for the first game.

It can be used as an enjoyable game, or it can be used as a teaching aid, or both. In one embodiment, the first game can be used to advantage to teaching a person the basic relations of propositional algebra. In a second embodiment, the first game can be used to teach the basic relations of arithmetic equality, inequality, and divisibility. In fact, there are an unlimited number of embodiments, each of which can be used to advantage to teach a person some manner of mathematical relations.

Other advantages of this system will be readily discernible upon a reading of the text hereinafter.

Each card bears on one face a pair of relations and/or a pair of values, and on the other face a fixed design of fixed color or colors. The decks are identical to each other on the value/relation face, but differ on the fixed design/color(s) face, which is uniform for each deck. A pair of relations for purposes of this specification and the following claims is defined as any mathematical (arithmetic, propositional, lingual, etc.) binary relation and its inverse, or a mathematical unary function (printed in two directions). A pair of values for purposes of this specification and the following claims is defined as any two values (or one value written in two directions) such that the card on which they are written may appear meaningfully on one side of a card on which a binary relation pair appears. Values and relations may be represented by any words or symbols, so long as their meanings remain consistent throughout the game in which they are used. This means that some embodiments of this invention could be constructed from decks of traditional playing cards.

Before the start of the first game, a number of cards are chosen to be placed, relation/value face up, forming a complete mathematical (arithmetic, propositional, lingual, etc.) statement (or an incomplete one to be validly completed by the first player). The cards are then shuffled, and a number of cards are dealt to each player relation/value face down. Each player looks through his cards privately and attempts to get rid of them in a manner similar to that used in the traditional card game "Eights" (also known as "Crazy Eights" or "Swedish Rummy"), by placing one or more cards per turn (in accordance with the rules of the applied embodiment) such that a valid statement results, picking extra cards when necessary. The first player to get rid of all his cards in this manner is the winner of the first game.

At the beginning of the second game, all of the decks are shuffled together and a number of cards are dealt out fixed face up and sorted according to design/color. The rest of the cards are dealt out fixed face down, so that all have the same number of cards, and any remaining cards are added to the fixed face up cards. The players then look through their cards privately and bid numbers of cards for cards of another design/color in the fixed face up set, trying to gain the largest number of cards of one or more decks.

SUMMARY OF THE INVENTION

This invention presents a given number of decks of cards, each card having one side which is identical with respect to all other cards in its own deck, but unique with respect to all cards of other decks, and the other side showing a value pair and/or a relation pair (as previously defined). Also included may be one extra set of cards, each card having one side bearing some type of punctuation (as defined hereinafter), and the other side identical with respect to all other punctuation cards, but unique with respect to all nonpunctuation cards.

Punctuation for purposes of this specification and the following claims is defined as any words, symbols, or characters without which the same concept could be expressed by position, but which are used anyway through choice or convention.

The value/relation/punctuation side of the cards should be designed so that the following specifications are met:

(1) Any value or relation card should be readily identifiable from at least two opposite corners.

(2) Every value card should have its value printed in two colors, going in opposite directions on the card.

(3) Every relation card should use the same two colors, having each of its relations (even if they are the same relation) printed in one color and one direction on the card.

(4) Every punctuation card should use the same two colors, or just one of the two, having its punctuation printed in as many directions.

(5) It should be possible to line up any two cards in such a manner that one color and direction line up on one side, and the other color and direction line up on the other side.

(6) The only exception to the above specifications are the following:

(A) In an embodiment in which all statements formed in one direction are identical in meaning to the statement simultaneously formed in the opposite direction, only one color need be used (for both directions).

(B) In an embodiment in which all symbols representing values have meanings which remain the same when the symbol is rotated 180 degrees (e.g. a pentagon in an embodiment designed to teach the geometric shape relations of congruence, similarity, and comparative size), all symbols representing relations represent their inverse relations when rotated 180 degrees (e.g. an equal sign, a "less than" sign, or a "more than" sign), and any punctuation symbols used are such that if two were placed on one card in opposite directions, the effect would be two of the same symbol, in the same direction, one underneath the other (e.g. parentheses, brackets, or braces), only one color need be used, and the symbols need only be written in one direction.

During the course of play of the first game, players create valid relational statements either placing a relation or value card such that the colors and directions line up properly, or by placing a unary function relation card near the card to which the unary function is to be applied, or by doing both (depending on the rules of the given embodiment). If a player cannot create a valid statement using any of the allowed methods, he must pick cards from the stock deck until he can create a valid statement, at which point he ends his turn by doing so.

During the course of play of the second game, the value/relation faces of the cards are not relevant to the rules of the game.

An object of this invention is to present an enjoyable game with fairly simple rules whereby a player can learn a set of relations, and which can be enjoyed by two to as many as twenty-five or more players. A further object of this invention is to provide a simple and enjoyable game which provides practice in reasoning as well as being a means of facilitating the separation of the decks from each other for future play among smaller groups of players.

Other objects of this invention will be readily discernable upon a reading of the text hereinafter.

BRIEF DESCRIPTION OF THE DRAWINGS

FIG. 6 illustrates a card arrangement which would be valid in an embodiment useful for teaching the geometrical relations, propositional algebra, and arithmetic.

DESCRIPTION OF THE PREFERRED EMBODIMENT

Figure 1:
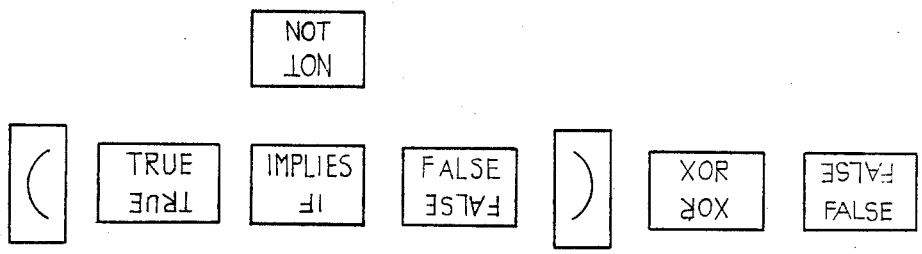
FIG. 1 illustrates a card arrangement which would be valid in an embodiment useful for teaching propositional algebra. The cards with parentheses on them are punctuation cards. Each parenthesis is two representations: a right parenthesis in one direction and a left parenthesis in the opposite direction.
Figure 2:
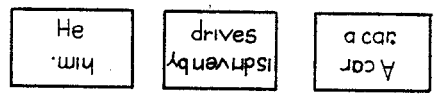
FIG. 2 illustrates a card arrangement which would be valid in an embodiment useful for teaching the English language. In this embodiment, no separate cards are used for punctuation. The phrase "A car" (with a capital "A") and the phrase "a car." with a lowercase "a" and a period) are two different representations of the same concept, while "He" and "him." represent two concepts which differ only for grammatical purposes.
Figure 3:
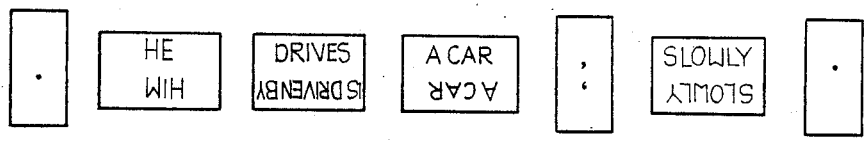
FIG. 3 illustrates a card arrangement which would be valid in a second embodiment useful for teaching the English language. In this embodiment, separate cards are used for punctuation. Each period is only a period in one direction, and appears alone on its card. There is also a card with two commas, one in each direction.
Figure 4:
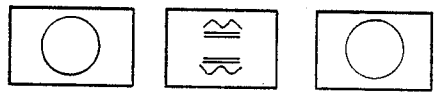
FIG. 4 illustrates a card arrangement which would be valid in an embodiment useful for teaching the geometrical relations. In this embodiment a shape is used to represent the same concept in both directions.
Figure 5:
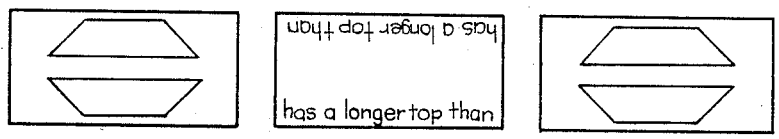
FIG. 5 illustrates a card arrangement which would be valid in a second embodiment useful for teaching the geometrical relations. In this embodiment two shapes are necessary to represent the same concept in both directions.

The following listing is an example of a deck of cards for teaching propositional relations.

| VALUE CARDS | BINARY RELATION CARDS | UNARY FUNCTION CARDS |
|---|---|---|
| 10 TRUE cards | 4 IF/IMPLIES cards | 3 NOT cards |
| 10 FALSE cards | 4 IMPLIES/IF cards | |
| | 4 IFF cards | |
| | 4 OR cards | |
| | 4 AND cards | |
| | 4 XOR cards | |

(An IF/IMPLIES card has IF printed in green, IMPLIES in black; an IMPLIES/IF card has IMPLIES printed in green, IF in black.)

A full set for play between up to 25 players might consist of five such decks (a red deck, a blue deck, a yellow deck, a purple deck, and an orange deck), and a punctuation set consisting of three right/left parentheses (right in green, left in black) and three left/right parentheses (left in green, right in black).

In this embodiment, a statement must have a value of "TRUE" to be valid. If the players agree to use three cards for the statement, then the valid card arrangements are as follows:

| GREEN STATEMENT | BLACK STATEMENT IN SAME CARD ARRANGEMENT |
|---|---|
| TRUE AND TRUE | TRUE AND TRUE |
| FALSE OR TRUE | TRUE OR FALSE |
| TRUE OR FALSE | FALSE OR TRUE |
| TRUE OR TRUE | TRUE OR TRUE |
| FALSE XOR TRUE | TRUE XOR FALSE |
| TRUE XOR FALSE | FALSE XOR TRUE |
| FALSE IMPLIES FALSE | FALSE IF FALSE |
| FALSE IMPLIES TRUE | TRUE IF FALSE |
| TRUE IMPLIES TRUE | TRUE IF TRUE |
| FALSE IF FALSE | FALSE IMPLIES FALSE |
| TRUE IF FALSE | FALSE IMPLIES TRUE |
| TRUE IF TRUE | TRUE IMPLIES TRUE |
| FALSE IFF FALSE | FALSE IFF FALSE |
| TRUE IFF TRUE | TRUE IFF TRUE |

Each of the above described card arrangements, or any other card arrangements, for purposes of specification and the following claims shall be identified by the green statement showing in the arrangement.

The first game could be played by up to five players using one deck, up to ten players using the two decks, up to fifteen players using three decks, up to twenty players using four decks, and up to twenty-five players using five decks (by adding more decks, more players could be accomodated).

To start the first game, the NOT cards would be removed from the deck(s), two cards, randomly chosen by someone other than the dealer, are placed relation/value face down beside each other, at least one of the two cards being a value card. The remaining cards would be shuffled, six cards would be dealt to each player, relation/value face down, and the new remainder would be placed, relation/value face down, as a "stock" pile. The two previously chosen cards would then be turned over and placed so that the green and black colors line up with themselves. If both cards were value cards, then they would be spread apart to make room for a third card between them.

The dealer would play first, looking through his hand and attempting to find a card which, when placed relation/value face up with the others, will construct a valid card arrangement. If the dealer could not find such a card, he would pick cards, one at a time, from the stock pile, until he picked such a card, which he would then place with the other relation/value face up cards to complete a valid card arrangement. All players from this point onward would be required to place one card of top of any of the cards in the arrangement without changing the validity of the arrangement, picking cards from the stock pile when necessary, and playing in an order agreed upon by all players before the game began. The first Player to run out of cards would be the winner.

Playing a card for purposes of this specification and the following claims is defined as placing one card in the card arrangement.

A play for purposes of this specification and the following claims is defined as the act of playing either one card, or a NOT card with another card in one turn.

More complex versions of the same game could be played in exactly the same manner with one or more of the following exceptions:

(1) NOT cards would not be removed from the deck before dealing, and would be played in accordance with one of the rules from the NOT CARD RULE SET to be defined hereinafter.

(2) At the start of the game, a format would be agreed upon by the players in which the parentheses might be used, e.g. the following format might describe the green statement of a chosen format:

VALUE RELATION ( VALUE RELATION VALUE )

The order of precedence of evaluation of relations from first evaluated to last evaluated would be as follows:

(i) Anything within a pair of parentheses before anything outside of the same pair or parentheses
(ii) NOT applied to a value
(iii) AND
(iv) NOT applied to an AND
(v) OR, XOR
(vi) NOT applied to an OR, NOT applied to an XOR
(vii) IF, IMPLIES, IFF
(viii) NOT applied to IF, NOT applied to IMPLIES, NOT applied to IFF
(a NOT applied to a relation would be applied to the result of the relation; relations having equal precedence would be evaluated from left to right.)

Once a format were chosen, it would either remain the same throughout the game, or change in accordance with one or more rules of the PARENTHESES RULE SET to be defined hereinafter. When using a subset of the PARENTHESES RULE SET, the unused punctuation cards would be placed parentheses face up, apart from the other face up cards, and could be accessed by any player during his turn to be played in accordance with the rule or rules used.

(3) Cards would be played in accordance with one or both rules from the CARD PLACEMENT RULE SET to be defined hereinafter.

(4) The final play of the game would be played in accordance with one or more rules from the FINAL PLAY RULE SET to be defined hereinafter.

The NOT CARD RULE SET for purposes of this specification and the following claims is the following set of rules:

(1) A player may play the first NOT card by placing it, NOT face up, directly adjacent to the green side of a binary relation card, and simultaneously (i.e. during the same turn) changing the statement with a value or relation card (but not another NOT card) so that the statements formed if the NOT card were not considered would have a value of "FALSE": e.g. if the green statement before the NOT card is played is "TRUE OR FALSE", a NOT card could be played only with an AND card, a FALSE card, an IFF card, or an IMPLIES/IF card, resulting in one of the following green statements, respectively:

| NOT | NOT |
| TRUE AND FALSE | FALSE OR TRUE |
| NOT | NOT |
| TRUE IFF FALSE | TRUE IMPLIES FALSE |

While the NOT card is in the arrangement, it is considered to apply to the green statement and the black statement, and players must play their cards accordingly. Each subsequent NOT card may be played by placing it, NOT face up, underneath the top card of one of the three value/binary relation card piles, and turning over the NOT card already in place, and playing another value or binary relation card to change the arrangement so that it is valid considering the visibility or non-visibility of the NOT card's face.

(2) The first NOT card may be played by placing it, NOT face up, directly adjacent to the green side of a value card, to which the NOT card would apply; e.g. if the green statement were "TRUE OR FALSE", then the NOT card may be played to change it to

NOT
TRUE OR FALSE

The NOT card remains NOT face up and applies to the card which it is adjacent to; players must play their cards accordingly. Each subsequent NOT card may be played either by placing it adjacent to the other value card or by turning over a NOT card already in place as in Rule (1) of this rule set, with the exception that each player must play one card per turn, and no false statement may appear as a result of a NOT card being played.

(3) A NOT card may be played in accordance with Rule (1) or Rule (2) of this rule set, but not both in the same turn.

A NOT card is not allowed to be used in a final (winning) play when this rule is used.

(4) A NOT card may be played in accordance with Rule (1) or Rule (2) of this rule set, or both; e.g. the statement TRUE AND TRUE could be changed to NOT
TRUE OR FALSE in one turn.

A NOT card is not allowed to be used in a final (winning) play when this rule is used.

(5) A NOT card may be played in accordance with Rule (1) of this rule set, with the exception that it is the only card played, leaving an invalid arrangement, which the next player must to correct.

A NOT card is not allowed to be used in a final (winning) play when this rule is used.

(6) A NOT card may be played in accordance with Rule (3) of this set, with the exception that it is the only card played, and if an invalid arrangement results, the next player must correct it.

A NOT card is not allowed to be used in a final (winning) play when this rule is used.

(7) A NOT card may be played according to Rule (4) of this set with the exception that it is the only card played, and if an invalid arrangement results, the next player must correct it.

A NOT card is not allowed to be used in a final (winning) play when this rule is used.

(8) A NOT card may be played according to Rule (3) of this set with the exception that if an invalid arrangement results, it can be corrected with another NOT card.

A NOT card is not allowed to be used in a final (winning) play when this rule is used.

(9) A NOT card may be played according to Rule (4) of this set with the exception that if an invalid arrangement results, it can be corrected with another NOT card.

A NOT card is not allowed to be used in a final (winning) play when this rule is used.

(10) A NOT card may be played according to Rule (6) of this set with the exception that if an invalid arrangement results, it can be corrected with another NOT card.

A NOT card is not allowed to be used in a final (winning) play when this rule is used.

(11) A NOT card may be played according to Rule (7) of this set with the exception that if an invalid arrangement results, it can be corrected with another NOT card.

A NOT card is not allowed to be used in a final (winning) play when this rule is used.

The PARENTHESES RULE SET for purposes of this specification and the following claims is the following set of rules:

(1) A player is allowed to move one parenthesis (instead of playing a card) to correct an invalid arrangement caused by a NOT card.

(2) A player is allowed to move one pair of parentheses (instead of playing a card) to correct an invalid arrangement caused by a NOT card.

(3) A player is allowed to add or remove one pair of parentheses (instead of playing a card) to correct an invalid arrangement caused by a NOT card.

The CARD PLACEMENT RULE SET for Purposes of this specification and the following claims is the following set of rules:

(1) No player may place a relation or value card directly on top of a card showing the same relation or value. (This rule causes a different arrangement to be formed with every turn.)

(2) No player may place a relation or value card directly on top of a card which was just played.

The FINAL PLAY RULE SET for purposes of this specification and the following claims is the following set of rules:

(1) The players may agree before the start of the game on which card or cards are allowed to be used in the final play with the restriction that if Rule (5), Rule (6), Rule (7), Rule (8), Rule (9), Rule (10), or Rule (11) of the NOT CARD RULE SET is used, a NOT card is still prohibited in the final play.

(2) Any player about to make a final play must announce his situation to the other players. Each player holding more than three cards must give one card to that player, who then makes as many plays as he can make without drawing any from the stock deck, attempting to use his entire hand, which he may do, so long as he makes all plays in accordance with all active rules. If he cannot do so, the game proceeds with the next player's turn.

(3) Any player about to make a final play must announce his situation to the other players. Each player holding more than three cards must give one card to that player, who then makes as many plays as he can make without drawing any from the stock deck, until he is either unable to make a play or is about to make a winning play. This rule differs from Rule (2) of this set in that it is applied recursively until no player holds more than three cards.

A face-up card for purposes of the specification of the second game and the following claims is defined as any nonpunctuation card which has it deck color showing.

A face-down card for purposes of the specification of the second game and the following claims is defined as any nonpunctuation card which is not face-up.

To start the second game, three or more of the decks would be shuffled together, and ten cards would be dealt out face-up, and sorted according to deck color. The remaining cards would be dealt out equally, face-down, among the players until there were less cards than players. The cards that remain at that time would be added to the face-up cards, according to their deck color. (E.g. if there were eight players, and three decks were being used, each player would have 16 cards, and there would be 13 cards face-up.)

Color for purposes of the specification of the second game and the following claims refers to deck color.

The first player would choose one color to bid on, and bid cards of a different color or colors against cards of the chosen color. He would have to specify the number of cards he was bidding, the number of colors he was bidding, and the number and color of cards he was bidding for. No bid in the game is allowed to bid any cards for cards of the same color.

Chosen color for PurPoses of the specification of the second game and the following claims refers to the deck color chosen in the most recent bid.

A player's bid may be out-bid in the following manner. Let n, m, and p be numbers chosen by the most recent bidder, such that he has bid n cards of p colors for m cards of chosen color. Further, let n', m', and p' be the corresponding numbers chosen by the present bidder.

If $n<m$ then the most recent bidder could be outbid by any of the following bids:

(A1) $n$ cards of $p-1$ colors (assuming $p>1$) for m cards of chosen color.

(A2) $n+1$ cards of p colors for m cards of chosen color.

(A3) n cards of p colors for $m-1$ cards of chosen color.

(A4) Any bid in which $n'>=m'$.

(A5) Any bid which could outbid bid (A1), (A2), (A3), or (A4).

If $n=m$ then the most recent bidder could be outbid by any of the following bids:

(B1) n cards of $p-1$ colors (assuming $p>1$) for m cards of chosen color.

(B2) $n+1$ cards of p colors for m cards of chosen color.

(B3) n cards of p colors for $m-1$ cards of chosen color.

(B4) Any bid in which $n'>m'$.

(B5) Any bid which could outbid bid (B1), (B2), (B3), or (B4).

If $n>m$ then the most recent bidder could be outbid by any of the following bids:

($C_1$) n cards of p−1 colors (assuming p≦1) for m cards of chosen color.

($C_2$) n+1 cards of p colors for m cards of chosen color.

($C_3$) n cards of p colors for m−1 cards of chosen color.

($C_4$) Any bid which could outbid bid ($C_1$), ($C_2$), or ($C_3$).

When a player could not be outbid, he would add the cards he bid to the face-up cards, and add the cards he bid on to his hand, and the next player would then start another round of bidding. Players bid in a specific order, but they do not necessarily start new rounds of bidding in any order.

Before the start of the game, players would decide whether to allow passing. If passing were allowed, then in the event that a player were unable or uninclined to outbid the most recent bid, he would pass, and the next player would be permitted to make a bid. If passing were not allowed, then in the event that a player were unable or uninclined to outbid the previous player's bid, the bidding would not continue; the previous player's bid would be the final bid of that round of bidding.

A player may bluff, but if his bluff is discovered, he must add two cards of each color to the face-up cards. If the bluffer does not have two cards of each color, then he must add all of his cards to the face-up cards, and is no longer in the game. The player who made the bid previous to the bluff would then be considered as the most recent bid and the bidding would continue (unless the most recent bid could not be out bid). The only way a player's bluff can be discovered is by no player outbidding his bluff. If all players but one are eliminated in this manner, then the remaining player is the winner.

Before the start of the game, players would agree on which methods of ending the game could be used. Any player, when it is his turn to start the bidding, may instead end the game in any of the following ways (depending upon what was agreed upon before the start of the game):

(1A) If there is a number of cards face-up which can be evenly divided among the players, he may demand that they be so divided, each player, in the direction of play and starting with himself, choosing and taking one card at a time.

(1B) If there is a number of cards face-up which can be evenly divided among the players, he may demand that they be so divided, each player, in the direction of play and starting with the next player, choosing and taking one card at a time.

(2A) If there is a number of cards face-up which cannot be evenly divided among the players, he may demand that they be divided, each player, in the direction of play and starting with himself, choosing and taking one card at a time.

(2B) If there is a number of cards face-up which cannot be evenly divided among the players, he may demand that they be divided, each player, in the direction of play and starting with the next player, choosing and taking one card at a time.

(3A) If there is only one color of card face-up, he can call for a show bidding (A show bidding for purposes of the specification of the second game and the following claims is defined as a bidding in which the players bid by showing their cards, during which all bids are for the same number of cards, and at the end of which the final bidder adds the cards he bid on to his hand without giving up the cards he bid.), which he would start himself.

(3B) If there is only one color of card face-up, he can call for a show bidding, which the next player would start.

(4A) If there is only one card left face-up, he may claim it.

(4B) If there is only one card left face-up, he may give it to another player of his choice.

The methods, (1) thru (IV), must be chosen as follows:

(1) (1A) or (1B) but not both.
(11) (2A) or (2B) but not both.
(III) (3A) or (3B) but not both.
(IV) (4A) or (4B) or neither.

A color winner for a given color for purposes of the specification of the second game and the following claims is defined as a player who holds no less of the given color than any other player.

A color winner's color number for a given color for purposes of the specification of the second game and the following claims is defined as the number of cards he holds of the color for which he is a color winner.

A sole color winner for a given color for purposes of the specification of the second game and the following claims is defined as a player who holds more of the given color than any other player.

A sole color winner's sole color number for a given color for purposes of the specification of the second game and the following claims is defined as the number of cards he holds of the color for which he is a sole color winner.

At the end of the second game, scoring would be as follows:

(1) If a player is a sole color winner for more colors than any other player, then that player is the winner of the game.

(2) If case (1) does not exist and more than one player is a sole color winner, and only one sole color winner has the highest color number, that player is the winner of the game.

(3) If neither case (1) nor case (2) exists, and more than one player is a sole color winner, and one sole color winner is a color winner for more colors than any other sole color winner, that player is the winner of the game.

(4) If neither case (1), nor case (2), nor case (3) exists, and more than one player is a sole color winner, and one sole color winner has a color number that is higher than any color number of any other sole color winner, that player is the winner of the game.

(5) if neither case (1), nor case (2), nor case (3), nor case (4) exists, and one player is a color winner for more colors than any other player, then that player is the winner.

(6) If neither case (1), nor case (2), nor case (3), nor case (4), nor case (5) exists, and one player has a color number higher than any color number of any other player, then that player is the winner.

(7) If neither case (1), nor case (2), nor case (3), nor case (4), nor case (5), nor case (6) exists, then the second games is a draw.

The foregoing was given for illustrative purposes and no unnecessary limitations in the following claims should be drawn therefrom.

I claim:

1. An educational card game for entertaining a number of players comprising a deck of cards, a first definition of statements to be considered valid for the purposes of the game, and a set of rules such that:
   (a) each card of said deck has a first face identical to said first face of each other card in said deck, and a second face on which a representation appears in a first direction, and a representation appears in a second direction which is 180 degrees rotated from said first direction,
   (b) each card of said deck carrying on said second face in said first direction a representation of a first binary relation carries on said second face in said second direction a representation of a binary relation which is the mathematical inverse of said first binary relation,
   (c) each card of said deck carrying on said second face in said first direction a representation of a first binary function carries on said second face in said second direction a representation of a second binary function which, when applied to the same two arguments as said first binary function with the order of said same two arguments reversed when said second binary function is applied to them, produces the same result as said first binary function produces when applied to said same two arguments in their original order,
   (d) each card of said deck carrying on said second face in said first direction a representation of a unary function carries on said second face in said second direction a representation of the same unary function,
   (e) there exist in said deck at least two cards each of which carries on said second face in said first direction a representation of a binary relation and/or a binary function,
   (f) there exists in said deck at least one card carrying on said second face in said first direction a representation of a binary relation which does not appear on said second face of same card in said second direction,
   (g) for each card in said deck which carries on said second face a unary function there exists at least one other card of said deck which carries on said second face the mathematical inverse of that unary function,
   (h) each card of said deck carrying on said second face in said first direction a representation of a first concept that is not a binary relation, not a binary function, and not a unary function, carries on said second face in said second direction a representation of a concept which if different from said first concept differs only for grammatical purposes,
   (i) each statement defined by said first definition of statements can be represented in at least one direction using representations carried on said second faces of at least two cards of said deck,
   (j) no card of said deck carries on said second face any representation not useful for the purpose of representing a portion of at least one statement defined by said first definition of statements,
   (k) whenever any statement defined by said first definition of statements is represented in said first direction using representations carried on said second faces of cards of said deck, a statement defined by said first definition is represented in said second direction using representations carried on said second faces of same cards of said deck, and
   (l) whenever any statement defined by said first definition of statements is represented in said second direction using said second faces of cards of said deck, a statement defined by said first definition is represented in said first direction on said second faces of same cards of said deck.

2. The game of claim 1 further comprising additional cards and an additional definition of statements such that:
   (a) each card of said additional cards carries on at least one face a representation in at least one of two said directions.
   (b) each statement defined by said additional definition of statements can be represented in at least one direction using representations carried on said second faces of at least two cards of said deck and at least one representation carried on said at least one face of at least one card of said additional cards,
   (c) no card of said additional cards carries on said at least one face any representation not useful for the purpose of representing a portion of at least one statement defined by said additional definition of statements,
   (d) whenever any statement defined by said first definition of statements or said additional definition of statements is represented in said first direction using either representations carried on said second faces of cards of said deck or representations carried on said second faces of cards of said deck and at least one representation carried by said at least one face of at least one card of said additional cards, a statement defined by said first general definition or said additional definition of statements is represented in said second direction using either representations carried on said second faces of same cards of said deck or representations carried on said second faces of cards of said deck and at least one representation carried by said at least one face of at least one card of said additional cards, and
   (e) whenever any statement defined by said first definition of statements or additional definition of statements is represented in said second direction using either representations carried on said second faces of cards of said deck or representations carried on said second faces of cards of said deck and at least one representation carried by said at least one face of at least one card of said additional cards, a statement defined by said first definition or additional definition of statements is represented in said first direction using either representations carried on said second faces of same cards of said deck or representations carried on said second faces of cards of said deck and at least one representation carried by said at least one face of at least one card of said additional cards.

3. The game of claim 2 further comprising additional decks of cards, such that each card in each said additional deck has a said first face unique with respect to said first face of each card of original said deck and unique with respect to said first face of each card of each other said additional deck, but otherwise identical with respect to one card of original said deck.

4. The game of claim 3 wherein the set of valid statements is a set of propositional algebraic statements all having the same boolean value.

5. The game of claim 3 wherein the set of valid statements is a set of lingual statements.

6. The game of claim 3 wherein the set of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0 (zero).

7. The game of claim 2 wherein the set of valid statements is a set of propositional algebraic statements all having the same boolean value.

8. The game of claim 2 wherein the set of valid statements is a set of lingual statements.

9. The game of claim 2 wherein the st of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0 (zero).

10. The game of claim 1 further comprising additional decks of cards, such that each card in each said additional deck has a said first face unique with respect to said first face of each card of original said deck and unique with respect to said first face of each card of each other said additional deck, but otherwise identical with respect to one card of original said deck.

11. A game system comprising the game of claim 10 and further comprising a set of rules by which a separate game may be played using the components of the game of claim 10, wherein the cards are sorted and traded for one another in a manner which facilitates the separation of the individual decks from each other.

12. The game of claim 11 wherein the set of valid statements is a set of propositional algebraic statements all having the same boolean value.

13. The game of claim 11 wherein the set of valid statements is a set of lingual statements.

14. The game of claim 11 wherein the set of valid statements is a set of geometrical relational statements.

15. The game of claim 11 wherein the set of valid statements is a set of arithmetical relationship statements.

16. The game of claim 11 wherein the set of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0 (zero).

17. A game system comprising the game of claim 10 and further comprising a set of rules by which a separate game may be played using the components of the game of claim 10, wherein the cards are sorted and traded for one another in a manner which facilitates the separation of the individual decks from each other, and further comprising additional cards and an additional definition of statements such that:

(a) each card of said additional cards carries on at least one face a representation in at least one of two said directions, (b) each statement defined by said additional definition of statements can be represented in at least one direction using representations carried on said second faces of at least two cards of said deck and at least one representation carried on said at least one face of at least one card of said additional cards, (c) no card of said additional cards carries on said at least one face any representation not useful for the purpose of representing a portion of at least one statement defined by said additional definition of statements, (d) whenever any statement defined by said first definition of statements or said additional definition of statements is represented in said first direction using either representations carried on said second faces of cards of said deck or representations carried on said second faces of cards of said deck and at least one representation carried by said at least one face of at least one card of said additional cards, a statement defined by said first definition or said additional definition of statements is represented in said second direction using either representations carried on said second faces of same cards of said deck or representations carried on said second faces of cards of said deck and at least one representation carried by said at least one face of at least one card of said additional cards, and (e) whenever any statement defined by said first definition of statements or additional definition of statements is represented in said second direction using either representations carried on said second faces of cards of said deck or representations carried on said second faces of cards of said deck and at least one representation carried by said at least one face of at least one card of said additional cards, a statement defined by said first definition or addition definition of statements is represented in said first direction using either representations carried on said second faces of same cards of said deck or representations carried on said second faces of cards of said deck and at least one representation carried by said at least one face of at least one card of said additional cards.

18. The game of claim 17 wherein the set of valid statements is a set of propositional algebraic statements all having the same boolean value.

19. The game of claim 17 wherein the set of valid statements is a set of lingual statements.

20. The game of claim 17 wherein the set of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0 (zero).

21. The game of claim 10 wherein the st of valid statements is a set of propositional algebraic statements all having the same boolean value.

22. The game of claim 10 wherein the set of valid statements is a set of lingual statements.

23. The game of claim 10 wherein the set of valid statements is a set of geometrical relational statements.

24. The game of claim 10 wherein the set of valid statements is a set of arithmetical relational statements.

25. The game of claim 10 wherein the set of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0)zero.

26. The game of claim 1 wherein the set of valid statements is a set of propositional algebraic statements all having the same boolean value.

27. The game of claim 1 wherein the set of valid statements is a set of lingual statements.

28. The game of claim 1 wherein the set of valid statements is a set of geometrical relational statements.

29. The game of claim 1 wherein the set of valid statements is a set of arithmetical relational statements.

30. The game of claim 1 wherein the set of valid statements is a set of arithmetical relational, geometrically relational, and propositional algebraic statements all having the same value, and wherein the value of TRUE is interpreted as and optionally represented by the value 1 (one), and wherein the value of FALSE is interpreted as and optionally represented by the value 0 (zero).

* * * * *